(12) United States Patent
Tarjan et al.

(10) Patent No.: US 8,078,844 B1
(45) Date of Patent: Dec. 13, 2011

(54) SYSTEM, METHOD, AND COMPUTER PROGRAM PRODUCT FOR REMOVING A REGISTER OF A PROCESSOR FROM AN ACTIVE STATE

(75) Inventors: David Tarjan, Charlottesville, VA (US); Kevin Skadron, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 420 days.

(21) Appl. No.: 12/331,233

(22) Filed: Dec. 9, 2008

(51) Int. Cl.
*G06F 9/30* (2006.01)
*G06F 9/40* (2006.01)
*G06F 15/00* (2006.01)

(52) U.S. Cl. ........................................ 712/216; 712/217

(58) Field of Classification Search .................... None
See application file for complete search history.

(56) References Cited

U.S. PATENT DOCUMENTS

| | | | |
|---|---|---|---|
| 5,956,747 A | 9/1999 | Wilhelm et al. | |
| 7,171,545 B2 | 1/2007 | Devale et al. | |
| 7,418,551 B2 | 8/2008 | DeVale et al. | |
| 7,539,879 B2 * | 5/2009 | Terechko et al. | 713/300 |
| 7,743,238 B2 | 6/2010 | Biles | |
| 2005/0138297 A1 | 6/2005 | Sodani et al. | |
| 2006/0168463 A1 * | 7/2006 | Terechko et al. | 713/324 |
| 2007/0083735 A1 | 4/2007 | Glew | |
| 2009/0292892 A1 * | 11/2009 | Abernathy et al. | 711/163 |
| 2009/0292977 A1 | 11/2009 | Bradley et al. | |
| 2010/0161948 A1 | 6/2010 | Abdallah | |

OTHER PUBLICATIONS

Chang et al.; Energy-Saving Techniques for Low-Power Graphics Processing Unit; 2008; IEEE.*
Non-Final Office Action Summary from U.S. Appl. No. 12/331,069 mailed on Jun. 17, 2010.
H. Zeng and K. Ghose. "Register File Caching for Energy Efficiency." Proc. of the 2006 ACM/IEEE Int'l Symp. on Low Power Electronics and Design (ISLPED), pp. 244-249, Oct. 2006.
D. Ponomarev, K. Kucuk, O. Ergin, and K. Ghose. "Reducing Datapath Energy through the Isolation of Short-Lived Operands." In Proc. of the 12th ACM/IEEE/IFIP Int'l Conf. on Parallel Architectures and Compilation Techniques (PACT), pp. 258-268, Sep. 2003.
Butts, J.A. and Sohi, G. S., "Use-Based Register Caching with Decoupled Indexing", In. Proc. ACM/IEEE Int'l Symposium on Computer Architecture (ISCA), pp. 302, Jun. 2004.
U.S. Appl. No. 12/331,069, filed Dec. 9, 2008.
Non-Final Office Action from U.S. Appl. No. 12/331,069, dated Jan. 13, 2011.

* cited by examiner

*Primary Examiner* — Corey S Faherty
(74) *Attorney, Agent, or Firm* — Zika-Kotab, PC

(57) ABSTRACT

A system, method, and computer program product are provided for removing a register of a processor from an active state. In operation, an aspect of a portion of a processor capable of simultaneously processing a plurality of threads is identified. Additionally, a register of the processor is conditionally removed from an active state, based on the aspect.

23 Claims, 6 Drawing Sheets

SYSTEM, METHOD, AND COMPUTER PROGRAM PRODUCT FOR REMOVING A REGISTER OF A PROCESSOR FROM AN ACTIVE STATE

FIELD OF THE INVENTION

The present invention relates to processor registers, and more particularly to operating the processor registers with increased efficiency.

BACKGROUND

In the context of computer architectures, a processor register refers to memory available on a processor, where contents in the memory may be accessed more quickly than memory available elsewhere. Modern computer architectures typically function by transferring data from main memory into registers, operating on the data in the registers, and then moving the result back into main memory. A register file refers to an array of processor registers in a processor.

Conserving the power utilized by processors is one way of maximizing the efficiency and performance of the processor. To date, register files and scheduling logic are major sources of power loss (i.e. leakage) in a processor. There is thus a need for addressing these and/or other issues associated with the prior art.

SUMMARY

A system, method, and computer program product are provided for removing a register of a processor from an active state. In operation, an aspect of a portion of a processor capable of simultaneously processing a plurality of threads is identified. Additionally, a register of the processor is conditionally removed from an active state, based on the aspect.

DETAILED DESCRIPTION

Figure 1:
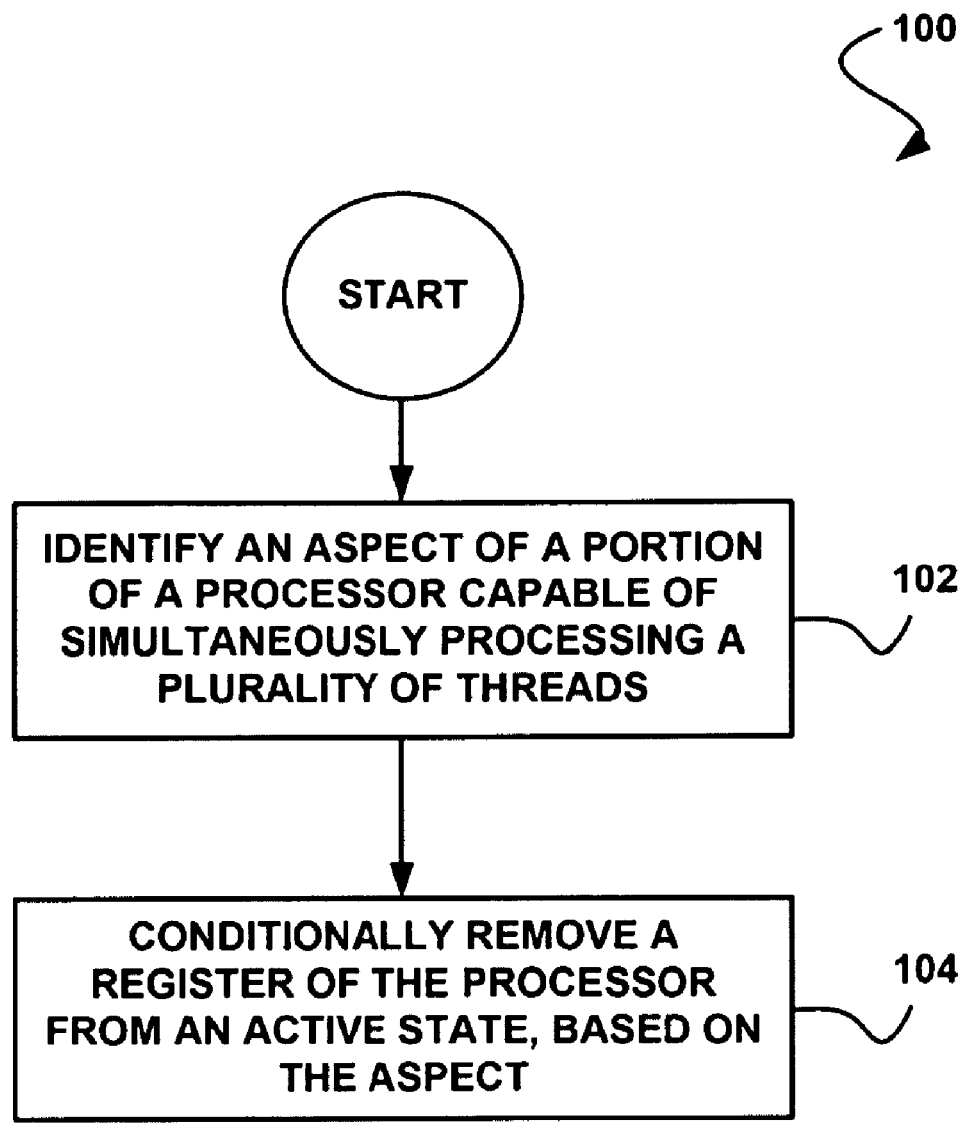
FIG. 1 shows a method for removing a register of a processor from an active state, in accordance with one embodiment.

FIG. 1 shows a method 100 for removing a register of a processor from an active state, in accordance with one embodiment. As shown, an aspect of a portion of a processor capable of simultaneously processing a plurality of threads is identified. See operation 102.

The processor may include any processor capable of simultaneously processing a plurality of threads and using a register file. For example, in various embodiments, the processor may include a central processing unit (CPU), a graphics processor, a network processor, a signal processor, a microcontroller, a graphics processor and one or more general-purpose CPUs on the same chip, etc. Furthermore, the portion of the processor capable of simultaneously processing a plurality of threads may include any portion of the processor, including a hardware portion or a software portion.

For example, in one embodiment, the portion of the processor capable of simultaneously processing a plurality of threads may include a shader unit for executing shader programs. In the context of the present description, a shader refers to a computer program or code associated with one or more processing stages required in rendering graphical models to a display.

As shown further in FIG. 1, a register of the processor is conditionally removed from an active state based on the aspect. See operation 104. In the context of the present description, an active state refers to a state of a register where data is able to be written to or read from the register. In various embodiments, the register may be moved from the active state by placing the register in a deactivated state (in which the data contents are not retained) or by placing the register in a retention mode state (in which the register cannot be read or written, but the value is preserved and is available once the register is reactivated). In either case, once removed from the active state, the register generally consumes less energy.

Furthermore, the aspect used to base the conditional removal of the register from the active state may include any aspect capable of indicating the register is or is not in condition for removal from the active state. For example, in one embodiment, the aspect of the portion of the processor may include stall characteristics and conditions of the portion. In another embodiment, the aspect may include a resource use characteristic. For example, the aspect may include the amount of time a resource is not being utilized by the portion of the processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
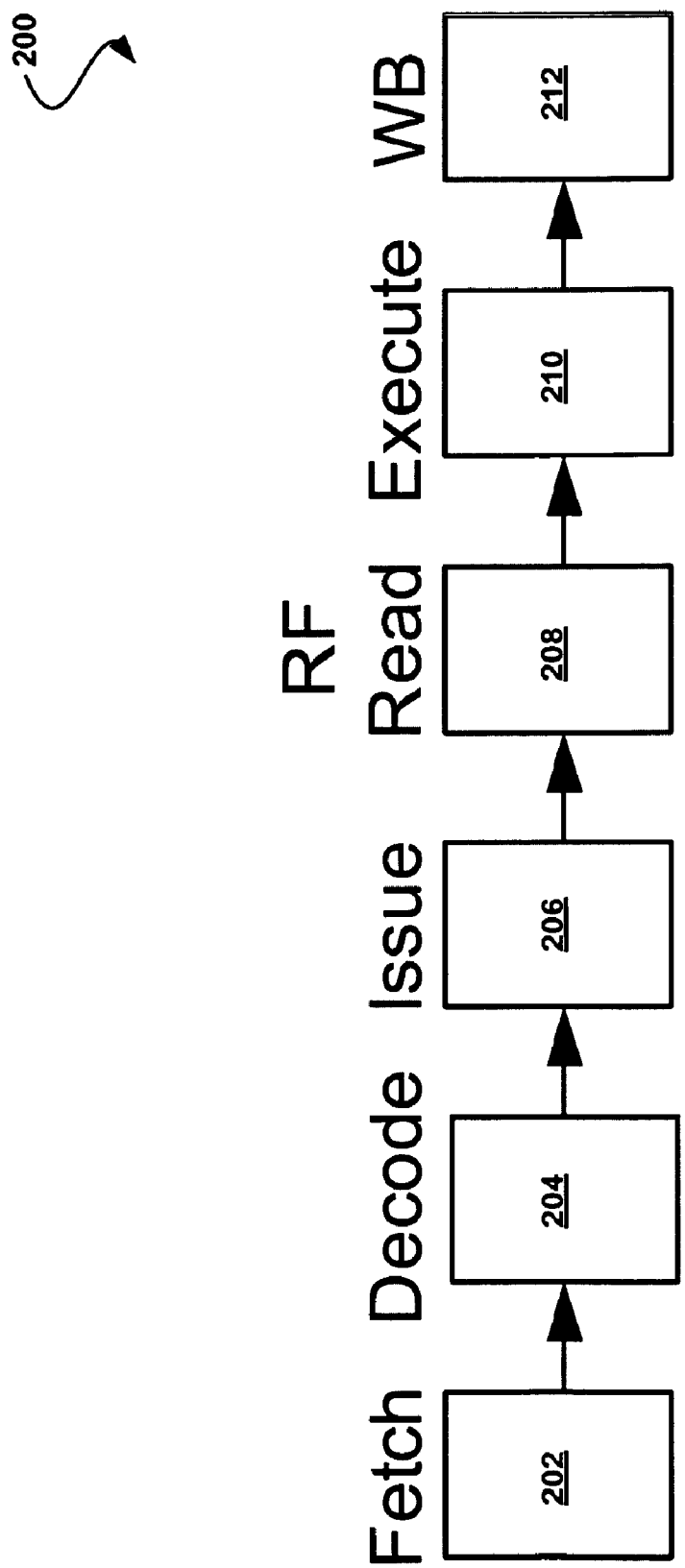
FIG. 2 shows a processor pipeline representing one embodiment of the sequence of stages in processing a generic processor instruction, and hence a system for moving registers between active and low-power states, in accordance with one embodiment.

FIG. 2 shows a processor pipeline system 200 for removing a register of a processor from an active state, in accordance with one embodiment. As an option, the present system 200 may be implemented in the context of the functionality of FIG. 1. In one embodiment for graphics processors, the pipeline may execute shader programs, which are short programs to perform the sequence of steps in rendering graphical models. Of course, however, the present system 200 may be implemented in any desired environment. It should also be noted that the aforementioned definitions may apply during the present description.

In some cases, although a majority of instructions in the shaders may include arithmetic instructions, the overall latency associated with the shader execution may be dominated by a small number of memory-access operations, which have a high latency. Since an overall computation of a system may be dependent on the values produced by the read from memory, only a limited overlap of independent computation and the read operations may be possible. In one embodiment, these memory accesses may be to a long-latency texture memory. This texture memory may reside on the same chip or on different chips.

In some cases, each shader may execute in isolation. Each shader may begin execution with an empty register file where values may be loaded. The shaders that use values from texture reads may begin execution by calculating one or more sets of texture addresses and use those texture addresses to perform one or more independent texture reads in parallel.

In some cases, the shaders may then stall, waiting for the texture reads. In this state, a majority of registers may not have been written and may either be invalid or hold a default value. Subsequent texture reads may again stall each of the shaders. In these cases, the maximum number of registers may only contain valid data for a small fraction of the overall execution time, with most of the execution time being spent waiting on texture reads.

In one embodiment, this wait time and associated properties may be utilized to implement functionality to deactivate registers that do not hold valid data, thereby eliminating leakage energy of those registers for a large fraction of the overall execution time. Additionally, the registers that contain data may be placed into a retention mode state. In this case, the retention mode state may include a mode with a much lower energy leakage rate over the duration of the texture read.

As an option, the processor pipeline 200 may be implemented on a GPU capable of performing register file caching. In this case, the main register file may have even greater leakage savings because a large fraction of reads and writes may be isolated in the register file cache and more entries in the main register file may be deactivated. More information regarding performing register file caching may be found in U.S. patent application Ser. No. 12/331,069, titled "MULTI-THREADED PROCESSOR SYSTEM, METHOD, AND COMPUTER PROGRAM PRODUCT CAPABLE OF UTILIZING A REGISTER FILE CACHE," filed Dec. 9, 2008, which is incorporated herein by reference in its entirety.

In either case, a register of a processor may be conditionally removed from an active state, by being placed in a deactivated state or by being placed in a retention mode state. As an example, an instruction may be fetched at a fetch stage 202. The instruction may then be decoded at a decoding stage 204. Using the decoded instruction, it may be determined whether a register is to be read in the RF Read stage 208 or written in the WB (writeback) stage 212. If it is determined that the register is to be written to and/or read from, the register may be placed in the active state.

Additionally, the instruction may be issued as part of an issue stage 206 and the register may be read as part of a register file read stage 208. Furthermore, the instruction may be executed as part of an execution stage 210, with a result of the execution being written as part of a write back stage 212. It may then be determined whether the register will be read from or written to again. If it is determined that the register will not be written to and/or read from again, the register may be removed from the active state.

Each shader may begin execution with all associated registers turned off. In one embodiment, a bitmap may be created and maintained to track the registers. In this case, the bitmap may track each register, indicating whether data has been written to the register at least once. Of course, in various embodiments, any data structure and hardware implementation may be utilized to track whether the register has been written in the past. In any case, the register of the processor may be conditionally removed from an active state, based on the tracking.

It should be noted that keeping track of individual registers is not the only option. In another embodiment, a coarser-grained tracking mechanism may be used. For example, in one embodiment, a register may be grouped with other registers and entire groups of registers may be removed from an active state together.

In various embodiments, the size of these groups may vary. For example, the size of these groups may vary from one (e.g. for individual register tracking) to half of a maximum number per thread register count. It should also be noted that, although the following techniques and architectures will be described in the context of individual registers, such techniques and architectures may also be applicable to groups of registers. Accordingly, the following techniques and architectures should not be limited to implementations utilizing individual registers.

After each instruction is decoded at the decode stage 204, a result register of the decoded instruction may be compared to the bitmap. If an instruction is the first instruction to write to a particular register, the entry of the register in the bitmap may be set to true and a signal may be sent to the register file to turn on the register. As an option, the register bitmap may be reset when a shader finishes execution.

As shown in FIG. 2, the decode stage 204 is separated from the write back stage 212 by the issue stage 206, which may take several clock cycles to complete. The wakeup signal is not time critical and may use circuits sized for minimum area and power. In one embodiment, the pipeline 200 may be implemented utilizing a processor (e.g. a GPU, etc.) that executes instructions utilizing a single instruction multiple data (SIMD) architecture. In this case, the overhead of the circuitry for decoding wakeup and deactivate signals for the register file may be shared among the multiple SIMD threads, greatly reducing the relative overhead.

In one embodiment, each row (or group of rows if multiple registers are grouped) of the register file may have its own cutoff transistor. In this case, the cutoff transistor may include a header or footer transistor that is capable of disabling a connection to a supply voltage (e.g. for a header transistor) or to a ground (e.g. for a footer transistor) for that particular row. When a register is turned off, the connection to the supply voltage may be disabled and bitcells may be left floating, greatly reducing the leakage power.

When the signal from the decode stage 204 arrives to turn on a row, the cutoff transistor may turn on and restore the connection of the bitcells to the supply voltage. In some cases, because of a large capacitance of a large number of bitcells per row, several cycles may occur before the bitcells reach a normal operating condition. This is acceptable since the best case latency from when an instruction is decoded until it writes back its result is lengthy.

In one embodiment, a power supply for wordline drivers of each row may be left on when the power to the bitcells is disabled. This may ensure that the wordline for each row, which is not being read from or written to, is actively driven to ground. Thus, the charge from non-selected rows will not leak onto the bitlines.

In some cases, registers may be turned off once they have been written to. Table 1 shows an example of code illustrating a pattern in a shader, where a texture address is calculated and a texture value is loaded. In this case, "R" indicates a register.

TABLE 1

| FADDI | R3, R3, 0x00000001; |
|-------|---------------------|
| FMUL  | R1, R3, R1;         |
| TEX   | R3, R1;             |

In the example illustrated by the code in Table 1, the value in R3 is last read by a floating point multiplier (FMUL) operation and then is overwritten by the texture read (TEX). After the texture read instruction has been issued, the value in R3 will not be used again, because the next access to R3 is to overwrite it with the result of the TEX operation. Thus, R3 may be turned off for the duration of the texture read without affecting the validity of the shader.

Often, instructions that are the last reader of a particular value stored in a register are hard to identify in hardware because gathering this information involves looking forward in the instruction stream and past control flow instructions. However, in one embodiment, a compiler may be utilized to gather this information. In turn, an existing processor instruction set (e.g. a GPU instruction set, etc.) may be modified with two new bits per instruction.

Figure 3:
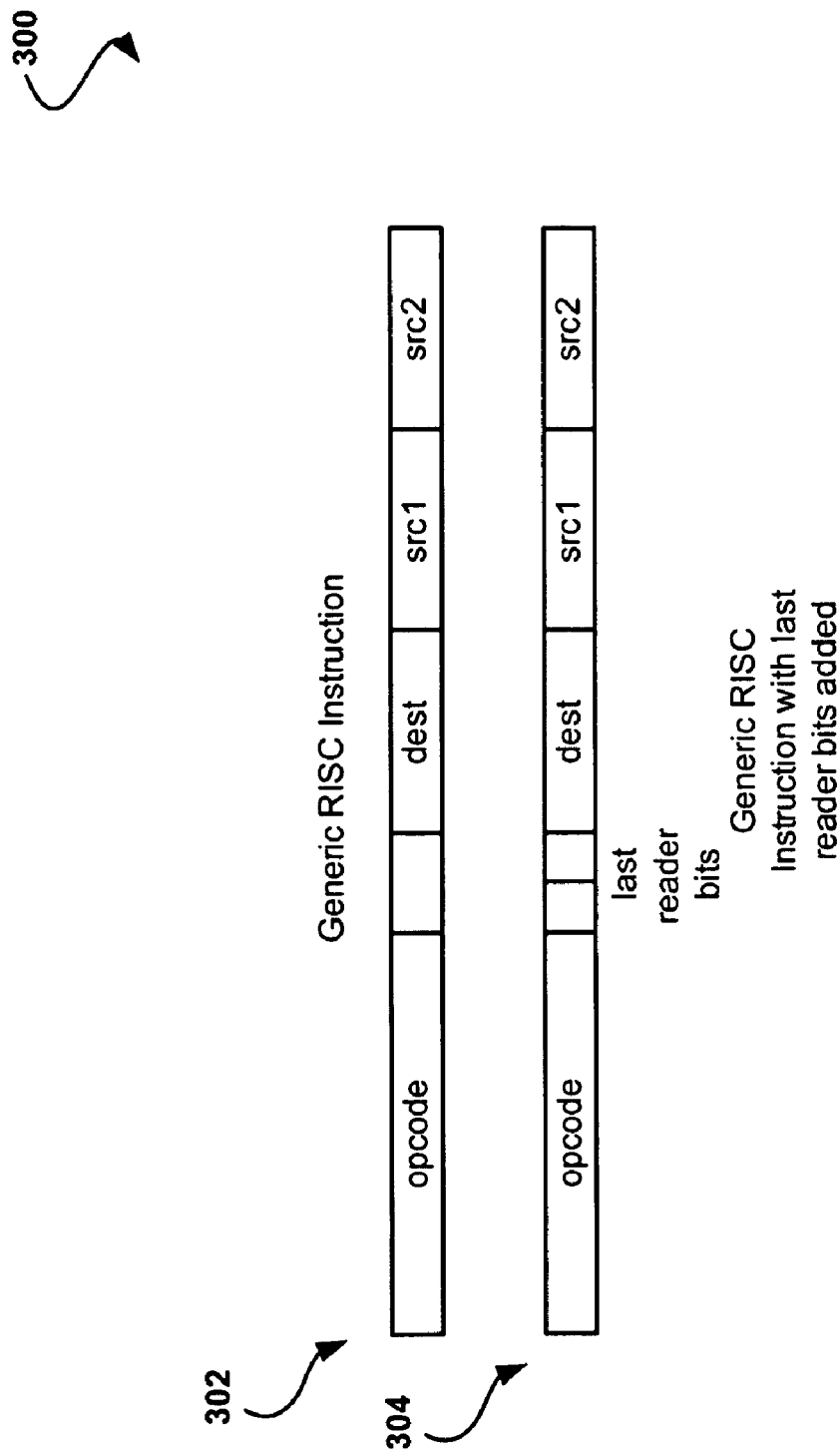
FIG. 3 shows a technique for augmenting a generic processor instruction, in accordance with one embodiment.

FIG. 3 shows a technique 300 for augmenting a generic processor instruction 302, in accordance with one embodiment. As an option, the technique 300 may be implemented in the context of the functionality and architecture of FIGS. 1-2. Of course, however, the technique 300 may be implemented in any desired environment. Again, the aforementioned definitions may apply during the present description.

As shown, a generic RISC instruction 302 is provided. This generic instruction 302 is modified to include two additional bits, resulting in a modified instruction 304. Using these additional bits, it may be determined whether to deactivate (i.e. turn off) or place in a standby state (i.e. place in a retention mode) a register.

For example, if the first bit is set, then the instruction may indicate that it is the last reader of the value in the first input operand. Additionally, if the second bit is set, then the instruction may indicate that it is the last reader of the value in the second input operand. Hardware associated with a processor pipeline may then use the information provided to decide whether to turn off registers that no longer contain a live value.

As an option, the hardware may track live and dead registers with a bitmap. In the context of GPUs, the fact that some instructions have orders of magnitude higher latency than others may be exploited. For example, on the GPU, when the hardware detects that a shader is stalled waiting on a long latency instruction (e.g. such as a texture load, etc.), the hardware may compare the live/dead bitmap with a first bitmap that tracks which registers are turned off. The result of this comparison may then be used to turn off the dead registers that were not previously turned off. By only turning off registers when it is known that the registers will not be turned back on within a short period, the hardware may ensure that the energy overhead of turning registers off is not wasted.

In the case that the processor is utilizing a SIMD architecture, the hardware may improve the scheduling by taking into account information from all of the SIMD threads, as the latency of any operation in SIMD processors is the maximum of the latency of the operation across all threads. A texture instruction, for example, may have a relatively high latency even if it the data is found in a local cache, since a math pipeline for a texture operation may be very long.

The latency of the texture operation may rise dramatically if the data is not available in any local cache or other local storage and has to be fetched from off-chip memory. Because of the operation of SIMD execution, if even a single thread does not find its data in the local cache, the latency of the texture load for all the SIMD threads is increased. Thus, the hardware for turning off registers may be more effective by monitoring the signals of all the SIMD threads and calculating the effective latency of any operations based on this information.

In one embodiment, registers with valid data may be prohibited from being turned off, except if information passed from a compiler indicates that the last reader of that value has already executed and no further read of that value will occur. Transitioning such valid registers into a retention mode where they cannot be read from or written to may be utilized to implement leakage savings.

For example, register files may store each bit in a core memory cell (e.g. an SRAM cell, etc.). In one embodiment, extra transistors may be connected to each cell to enable multiple read or write accesses simultaneously. Additionally, extra transistors may be connected to each cell to increase the speed of the read or write process.

The speed at which an SRAM cell can be read or written depends on the level of the supply voltage, with low voltages making it hard to read or write a cell. However, in one embodiment, two cross coupled inverters may be utilized to maintain the data at low voltages.

Figure 4:
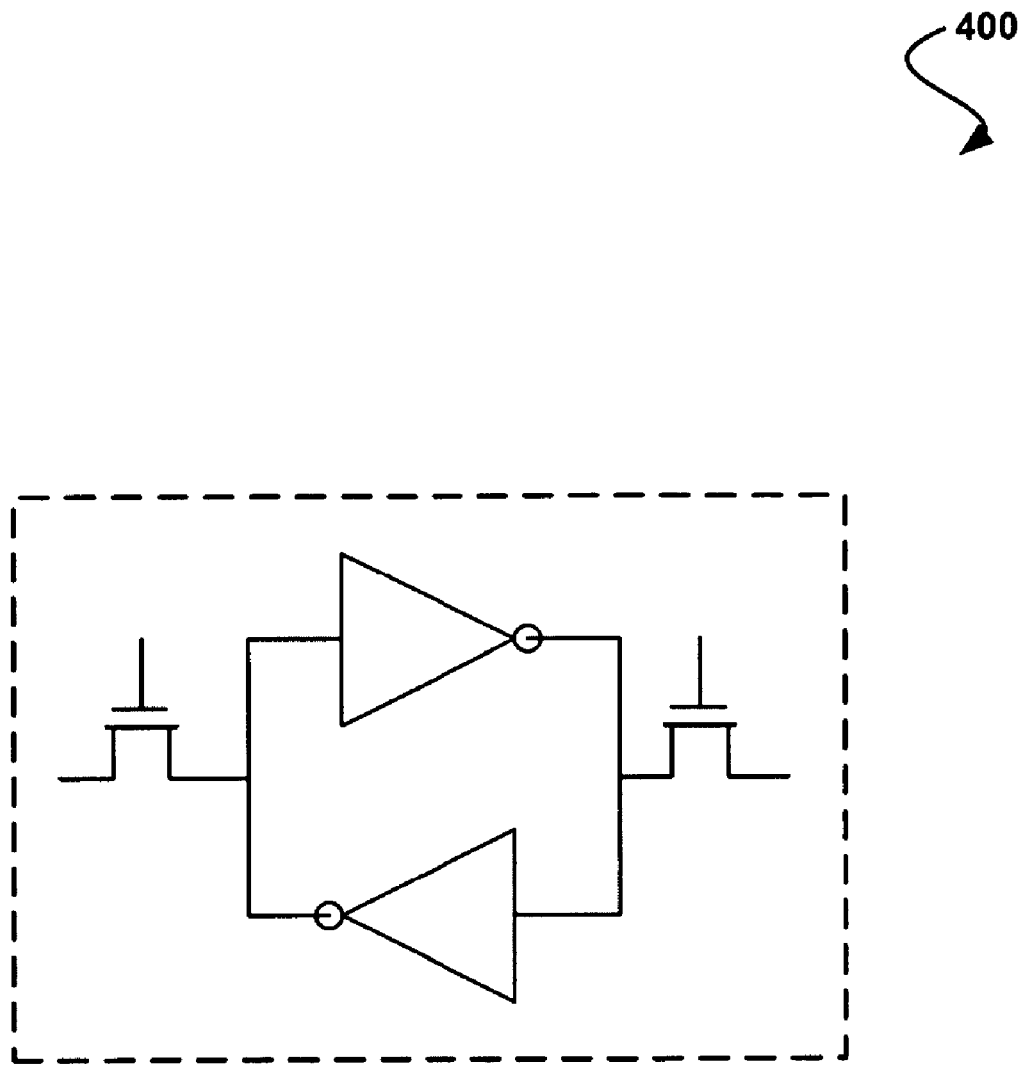
FIG. 4 shows a core memory cell including two cross coupled inverters and two access transistors, in accordance with one embodiment.

FIG. 4 shows a core memory cell 400 including two cross coupled inverters and two access transistors, in accordance with one embodiment. As an option, the memory cell 400 may be implemented in the context of the functionality and architecture of FIGS. 1-3. Of course, however, the memory cell 400 may be implemented in any desired environment. Furthermore, the aforementioned definitions may apply during the present description.

Because the leakage of each memory cell 400 is strongly correlated with the level of the supply voltage, putting the cell 400 into a low voltage retention mode will provide considerable leakage savings. As an option, all registers may be placed into this retention mode, not just the registers with values that will not be read in the future. It should be noted that the memory cell 400 is not completely turned off in retention mode.

In one embodiment, the retention mode functionality may be implemented using an auxiliary voltage that is provided to a register or a register file. As an option, this may be implemented utilizing a second supply grid on a chip including the processor, in addition to a first supply grid for standard implementations. In some cases, the second supply voltage may already be available on the chip for other purposes. For example, the chip may include multiple voltage islands with different supply voltages.

Figure 5:
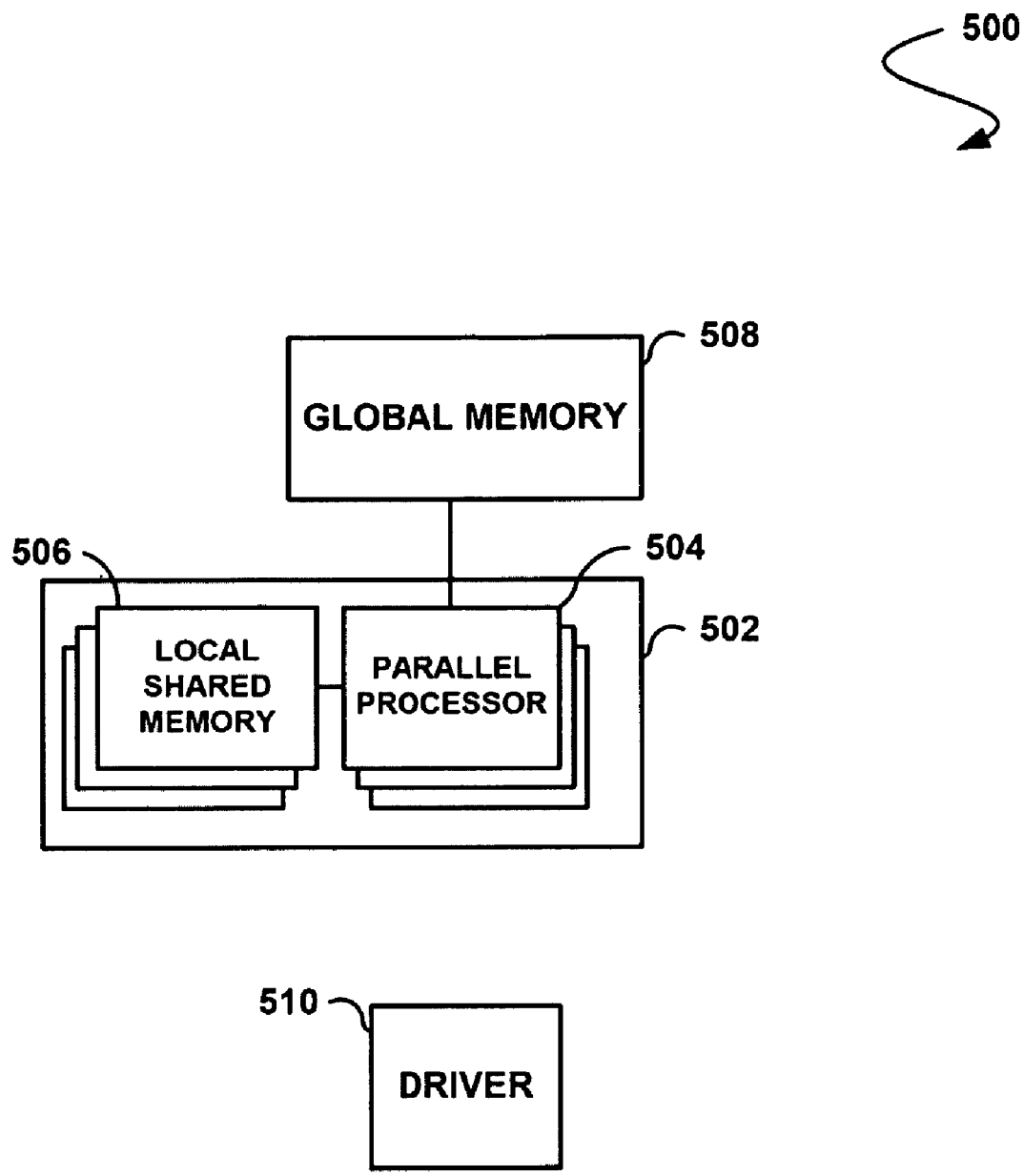
FIG. 5 shows a system for removing a register of a processor from an active state, in accordance with another embodiment.

FIG. 5 shows a system 500 for removing a register of a processor from an active state, in accordance with another embodiment. As an option, the present system 500 may be implemented in the context of the functionality and architecture of. FIGS. 1-4. Of course, however, the present system 500 may be implemented in any desired environment. Once again, the aforementioned definitions may apply during the present description.

As shown, a parallel general-purpose processing architecture 502 is provided. Such parallel processing architecture 502 includes a plurality of parallel processors 504. While not shown, such parallel processors 504 may be capable of operating on a predetermined number of threads. To this end, each of the parallel processors 504 may operate in parallel, while the corresponding threads may also operate in parallel.

In one embodiment, the parallel processing architecture 502 may include a SIMD architecture. In such a system, the threads being executed by the processor are collected into groups such that, at any instant in time, all threads within a single group are executing precisely the same instruction but on potentially different data.

In another embodiment, the foregoing parallel processing architecture 502 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 502 may include a processor with one or more vector processing elements such as the Cell processor, referring to the Cell Broadband Engine microprocessor architecture jointly developed by Sony®, Toshiba®, and IBM®.

With continuing reference to FIG. 5, the parallel processing architecture 502 includes local shared memory 506. Each of the parallel processors 504 of the parallel processing architecture 502 may read and/or write to its own local shared memory 506. This shared memory 506 may consist of physically separate memories associated with each processor or it may consist of separately allocated regions of one or more memories shared amongst the processors 504. Further, in the illustrated embodiment, the shared memory 506 may be embodied on an integrated circuit on which the processors 504 of the parallel processing architecture 502 are embodied.

Still yet, global memory 508 is shown to be included. In use, such global memory 508 is accessible to all the processors 504 of the parallel processing architecture 502. As shown, such global memory 508 may be embodied on an integrated circuit that is separate from the integrated circuit on which the processors 504 of the aforementioned parallel processing architecture 502 are embodied. While the parallel processing architecture 502 is shown to be embodied on the various integrated circuits of FIG. 5 in a specific manner, it should be noted that the system components may or may not be embodied on the same integrated circuit, as desired.

Still yet, the present system 500 of FIG. 5 may further include a driver 510 for controlling the parallel processing architecture 502, as desired. In one embodiment, the driver 510 may include a library, for facilitating such control. For example, such library 510 may include a library call that may instantiate the functionality set forth herein.

Further, in another embodiment, the driver 510 may be capable of providing general computational capabilities utilizing the parallel processing architecture 502 (e.g. a graphics processor, etc.). An example of such a driver may be provided in conjunction with the CUDAT™ framework provided by NVIDIA Corporation. In use, the driver 510 may be used to control the parallel processing architecture 502 to remove a register of a processor from an active state, as described above.

Additionally, in one embodiment, each thread context may have an associated piece of hardware scheduling logic. In this case, the type of scheduling logic (e.g. example register maps with poison bits, register scoreboards, reservation stations, issue queues, etc.) may depend on what kind of execution model is supported by the processor being utilized.

During a long latency texture read operation, a thread may stall for most of that latency. To save the leakage power of the scheduling logic, any thread stall on a texture read may be detected. Once the thread stalls, all instructions in the scheduling window are dependent on the completion of the texture read. Based on the fact that the thread stalled, all scheduler entries may be placed into a low leakage sleep mode (i.e. the retention mode), with the exception of the entry of the texture read. Thus, if there are N scheduler entries, the leakage during stalled periods would be reduced to I/N of the normal scheduler logic leakage.

It should be noted that, in some cases, GPUs may support special modes for executing computation tasks (e.g. floating point computations, etc.), where additional features of the GPU are activated. For example, the computation tasks may require arbitrary read/write access to some form of global memory 508. In this case, such global loads and stores may incur approximately the same latency as normal texture reads.

Because most computation programs cannot hide the latency of global loads and stores in a single thread, these programs are also stalled for long periods. Accordingly, the techniques described above may be implemented in the context of global loads and stores. Thus, the registers and scheduling logic of these computation tasks may be placed into low leakage states.

Figure 6:
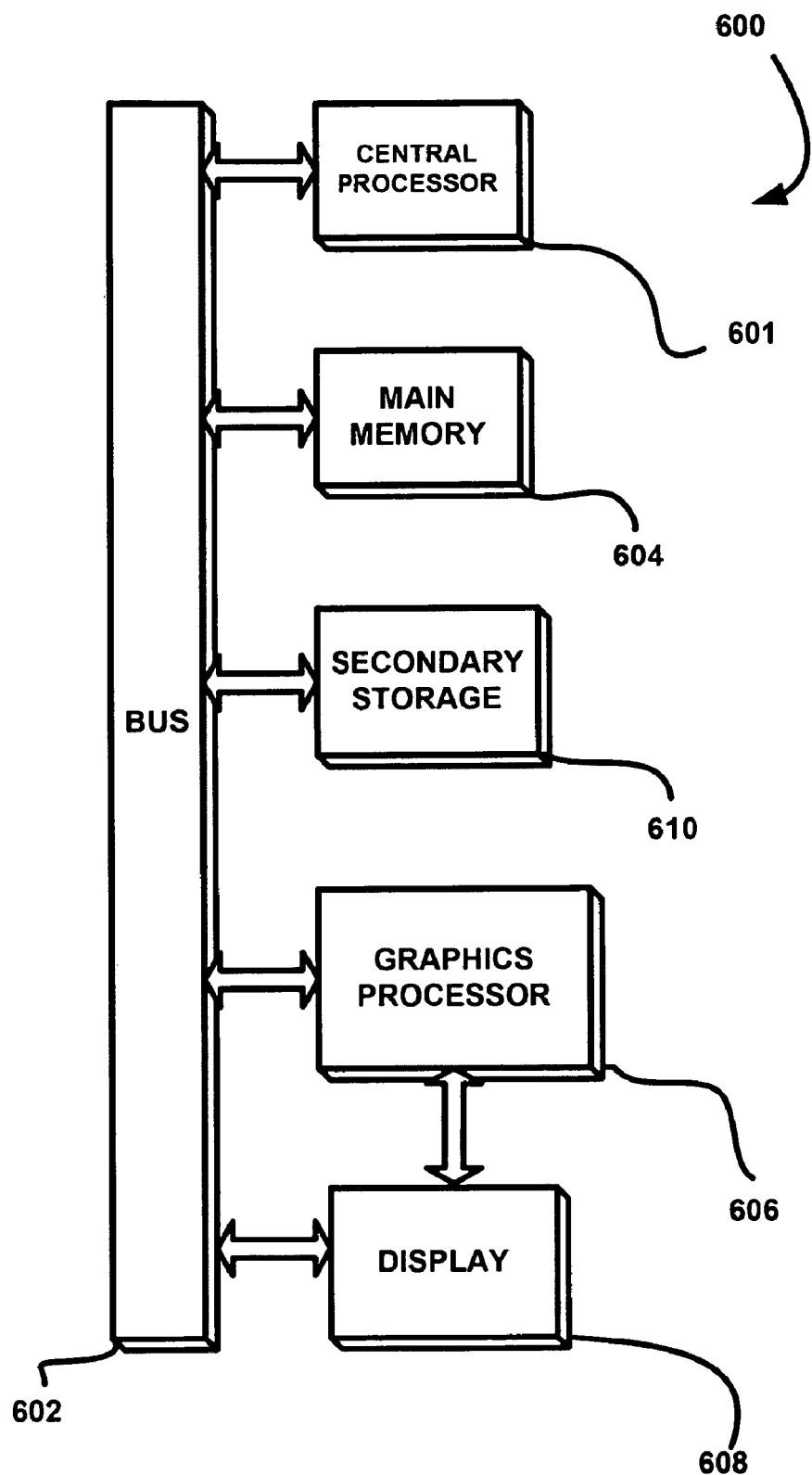
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions, including the various previous embodiments of FIGS. 1-5. Memory 604, storage 610 and/or any other non-transitory storage are possible examples of computer-readable media on which the aforementioned computer programs/computer control logic algorithms may be embodied.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying an aspect of a portion of a processor capable of simultaneously processing a plurality of threads;
    conditionally removing a register of the processor from an active state, based on the aspect;
    tracking whether the register has been written in the past, wherein a data structure includes a bitmap that is utilized to track whether each of a plurality registers has been written in the past; and
    comparing a dead bitmap with the bitmap that tracks which registers are turned off when it is detected that a shader is stalled waiting on an instruction.

2. The method of claim 1, wherein the processor includes a graphics processor.

3. The method of claim 1, wherein the processor includes a parallel general-purpose processor architecture.

4. The method of claim 1, wherein the processor includes a graphics processor and one or more general-purpose CPUs on the same chip.

5. The method of claim 1, wherein the processor includes a signal processor.

6. The method of claim 1, wherein the processor includes a network processor.

7. The method of claim 1, wherein the processor executes multiple threads.

8. The method of claim 1, wherein the portion of the processor includes the shader.

9. The method of claim 1, wherein the register is removed from the active state by being placed in a deactivated state.

10. The method of claim 1, wherein the register is removed from the active state by being placed in a retention mode state.

11. The method of claim 1, wherein the register of the processor is conditionally removed from the active state, based on the tracking.

12. The method of claim 1, and further comprising fetching another instruction.

13. The method of claim 12, and further comprising decoding the other instruction.

14. The method of claim 13, and further comprising determining whether the register is to be written, based on the decoded other instruction.

15. The method of claim 14, and further comprising conditionally placing the register in the active state, based on the determination.

16. The method of claim 13, and further comprising determining whether the register will not be read again, based on the decoded other instruction.

17. The method of claim 16, wherein the register of the processor is conditionally removed from the active state, based on the determination.

18. The method of claim 1, wherein the removing is independently performed for the plurality of the registers in association with each of the plurality of threads.

19. The method of claim 1, wherein the bitmap is reset when the shader finishes execution.

20. The method of claim 1, wherein a result of the comparison is used to turn off dead registers that were not previously turned off.

21. A computer program product embodied on a non-transitory computer readable medium, comprising:
    computer code for identifying an aspect of a portion of a processor capable of simultaneously processing a plurality of threads;
    computer code for conditionally removing a register of the processor from an active state, based on the aspect;
    computer code for tracking whether the register has been written in the past, wherein a data structure includes a bitmap that is utilized to track whether each of a plurality of registers has been written in the past; and
    computer code for comparing a dead bitmap with the bitmap that tracks which registers are turned off when it is detected that a shader is stalled waiting on an instruction.

22. An apparatus, comprising:
    a processor capable of simultaneously processing a plurality of threads;
    logic for removing a register of the processor from an active state, based on an aspect of a portion of the processor;
    logic for tracking whether the register has been written in the past, wherein a data structure includes a bitmap that is utilized to track whether each of a plurality of resisters has been written in the past; and
    logic for comparing a dead bitmap with the bitmap that tracks which registers are turned off when it is detected that a shader is stalled waiting on an instruction.

23. The apparatus of claim 22, wherein the processor remains in communication with memory and a display via a bus.

* * * * *

UNITED STATES PATENT AND TRADEMARK OFFICE
CERTIFICATE OF CORRECTION

| | | |
|---|---|---|
| PATENT NO. | : 8,078,844 B1 | Page 1 of 1 |
| APPLICATION NO. | : 12/331233 | |
| DATED | : December 13, 2011 | |
| INVENTOR(S) | : Tarjan et al. | |

It is certified that error appears in the above-identified patent and that said Letters Patent is hereby corrected as shown below:

In the claims:
Col. 9, claim 1, line 23; please insert --of-- before "registers" and after "plurality";
Col. 10, claim 22, line 43; please replace "resisters" with --registers--.

Signed and Sealed this
Twenty-second Day of May, 2012

David J. Kappos
*Director of the United States Patent and Trademark Office*